United States Patent
Low et al.

(10) Patent No.: US 12,101,306 B2
(45) Date of Patent: Sep. 24, 2024

(54) SYSTEMS AND METHODS TO ORCHESTRATE TRUSTED ENROLLMENT

(71) Applicant: DELL PRODUCTS L.P., Round Rock, TX (US)

(72) Inventors: Chooi Peng Low, Plano, TX (US); Michael Phillips, McKinney, TX (US)

(73) Assignee: Dell Products L.P., Round Rock, TX (US)

( * ) Notice: Subject to any disclaimer, the term of this patent is extended or adjusted under 35 U.S.C. 154(b) by 395 days.

(21) Appl. No.: 17/458,088

(22) Filed: Aug. 26, 2021

(65) Prior Publication Data
US 2023/0061123 A1    Mar. 2, 2023

(51) Int. Cl.
*H04L 29/06* (2006.01)
*H04L 9/30* (2006.01)
*H04L 9/32* (2006.01)
*H04L 9/40* (2022.01)

(52) U.S. Cl.
CPC ............... *H04L 63/08* (2013.01); *H04L 9/30* (2013.01); *H04L 9/3247* (2013.01); *H04L 9/3263* (2013.01); *H04L 63/126* (2013.01)

(58) Field of Classification Search
CPC ............................................. H01L 63/08
See application file for complete search history.

(56) References Cited

U.S. PATENT DOCUMENTS

| 2004/0117618 | A1* | 6/2004 | Kawaguchi | H04L 63/12 713/156 |
| 2013/0318343 | A1* | 11/2013 | Bjarnason | H04L 41/0809 713/157 |
| 2014/0058875 | A1* | 2/2014 | Yanchenko | G06Q 30/08 705/26.3 |
| 2018/0109418 | A1* | 4/2018 | Cammarota | H04W 12/50 |

OTHER PUBLICATIONS

Prijmak, "Guide Deploying Configuration Manager Client Using Group Policy", Jan. 17, 2020, 25 pgs.
Duo, "Duo Administration—Enroll Users", Captured from Internet Aug. 15, 2021, 14 pgs.
Samsung Knox, "Enroll A Single Device", Captured from Internet Feb. 25, 2021, 5 pgs.
Microsoft Docs, "Use Group Policy to Remotely Install Software", Captured from Internet May 6, 2021, 6 pgs.
Microsoft Docs, "What Is Co-Management?", Captured from Internet May 24, 2021, 7 pgs.
Microsoft Docs, "Set Up Enrollment for Windows Devices", Captured from Internet Aug. 9, 2021, 8 pgs.
(Continued)

*Primary Examiner* — Bradley W Holder
(74) *Attorney, Agent, or Firm* — Egan, Enders & Huston LLP.

(57) ABSTRACT

Systems and methods are provided that may be implemented to orchestrate trusted enrollment of an endpoint client information handling system by deploying a signed payload of an enrollment package to the endpoint client system, and by using a client software agent executing on the endpoint client system to first verify the distribution chain and/or
(Continued)

signature of the deployed enrollment package before proceeding to use other information contained in the enrollment package to contact a registration server to enroll the endpoint client system.

19 Claims, 4 Drawing Sheets

(56) References Cited

OTHER PUBLICATIONS

Microsoft Docs, "Enroll a Windows 10 Device Automatically Using Group Policy", Captured from Internet Feb. 23, 2021, 20 pgs.
Tech Target, "Group Policy Object (GPO)", Sep. 10, 2019, 3 pgs.
Microsoft Docs, "Group Policy Objects", May 31, 2018, 2 pgs.
Dell, "Wyse Management Suite", Sep. 2020, 8 pgs.
Microsoft Docs, RSA CryptoServiceProvider. VerifyData(Byte[] , Object, Byte[] ) Method (System, Security. Cryptography), Obtained from Internet Aug. 2, 2021, 2 pgs.
Boyapalle et al., "Systems and Methods for Associating Attested Information Handling Systems to End User Accounts", U.S. Appl. No. 17/354,654, filed Jun. 22, 2021, 30 pgs.

\* cited by examiner

SYSTEMS AND METHODS TO ORCHESTRATE TRUSTED ENROLLMENT

FIELD

This application relates to information handling systems and, more particularly, to software enrollment.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Enrollment is a process that some client software may employ on a client information handling system to register its presence to a registration server, which may be hosted either on-premise or remotely in the cloud. For enrollment, client software needs to be given enough information to securely communicate with the registration server. The type of information that is needed by the client software to accomplish enrollment usually includes the registration server uniform resource locator (URL), tenant data (i.e., in the case that the client software is a multi-tenant solution that is hosted in the cloud), and other deployment metadata that is relevant to the client enterprise.

Today, conventional device-server enrollments for endpoint client systems are performed within secure facilities; using scripts, files, command line arguments; or by using hard-coded server information on the endpoint client software agent. Using scripts, files, command line arguments is unsecured and prone to human errors unless the entire process is locked down. Using hard-coded server information on the endpoint client software agent requires special agent builds for customer-specific deployments.

Typically, a vendor server acting as a conventional fulfillment orchestrator provides software enrollment information to a client software agent executing on an endpoint client information handling system. This software enrollment information typically includes the registration server URL, together with some other credentials and metadata that the client software agent should present to the registration server. This software enrollment information is usually put in a file, a registry setting, or provided to the endpoint client information handling system as plain arguments. In some cases, the registration server URL is hard-coded within software code on an endpoint client information handling system, although such hard-coding does not usually work well for client software deployments where the registration server is located on a client's premise, since the local network address of such an on-premise registration server is typically not known in advance at time of client software coding.

SUMMARY OF THE INVENTION

Disclosed herein are systems and methods that may be implemented to orchestrate trusted enrollment of an endpoint client information handling system. Embodiments of the disclosed systems and methods may be implemented to both ensure that a client software agent on the endpoint client system is provided with trusted and verified enrollment information for the endpoint client system, and to ensure that the client software agent contacts the correct valid registration server to enroll the endpoint client system with the registration server, including registering its presence to the registration server. In one embodiment, the disclosed systems and methods may be implemented to provide an endpoint client enrollment mechanism that is verifiable from start-to-finish from the point of view of an endpoint client system upon which the endpoint software agent is installed.

In one embodiment the disclosed systems and methods may be implemented to deploy a signed payload of an enrollment package to the endpoint client system, and by using a client software agent executing on the endpoint client system to first verify the distribution chain and/or signature of the deployed enrollment package before proceeding to use other information contained in the enrollment package to contact a designated registration server to enroll the endpoint client system. In one embodiment, the disclosed systems and methods may be advantageously implemented to provide physical and administrative security controls to securely enroll an endpoint client system with the correct valid registration server (e.g., and on the correct valid network tenant domain where endpoint client software is a multi-tenant solution that is hosted in the cloud).

In one embodiment, a client software agent executing on an endpoint client system may be provided with a public root signing certificate (e.g., software vendor public key) embedded in the client software agent binary code on the endpoint client system, and the client software agent may be programmed to verify the distribution chain of the deployed enrollment package by comparing and matching its embedded software vendor public key to a copy of the same software vendor public key that is contained within the deployed enrollment package.

In one embodiment, the fulfillment orchestrator server may additionally or alternatively provision the payload of the enrollment package provision in response to a request from a customer for enrollment of the endpoint client information handling system. The fulfillment orchestrator server may verify the legitimacy of the customer enrollment request (e.g., by verifying the legitimacy of logon credentials presented by the software customer together with the enrollment request) before provisioning the requested enrollment package. The enrollment package may include enrollment data or information entered by the customer together with the customer request, as well as a copy of the software vendor public key that is also embedded in the binary code of the client software agent on the endpoint client system. In this embodiment, the customer-entered enrollment information is required by the client software agent for completing enrollment of the endpoint client system.

In one embodiment, the fulfillment orchestrator server may also provision and issue a customer private key as a customer signing certificate in response to the verified enrollment request received from a particular software customer, and may include a copy of a customer public key corresponding to the customer private key in the enrollment package. The fulfillment orchestrator server may use the customer private key to sign the enrollment package prior to deploying the signed enrollment package to the endpoint client system for that particular software customer. The client software agent may then verify the integrity of the deployed signed enrollment package by using the provided customer public key to verify that the signature of the signed enrollment package matches the provided customer public key.

In one embodiment, the enrollment information included in the deployed enrollment package may include information provided by the customer request that identifies the correct registration server (e.g., such as the network address of the registration server, secure sockets layer "SSL" server certificate, etc.) and/or additional information that may be used by the client software agent (e.g., such as the email domain of the endpoint client system and/or customer tenant network domain) to ensure that the client software agent connects with the correct registration server to enroll the endpoint client system.

Using embodiments of the disclosed systems and methods, a client software agent executing on an endpoint client system may safely connect with the correct registration server, and present the registration server with information that has not been tampered with, and that the client software agent has verified to be unchanged from the time of creation of the enrollment package by the fulfillment orchestrator server. Embodiments of the disclosed systems and methods may also be employed by the software client agent to ensure that a malicious actor (e.g. who may be a different legitimate customer of the software vendor) cannot maliciously divert the software client agent to a different (and unintended) registration server.

The disclosed systems and methods may be advantageously implemented in a manner that is in contrast to a conventional software enrollment process in which a client software agent executing on an endpoint client system is unable to verify the integrity of the enrollment information that it is given, regardless of how the enrollment information is staged or provided to the endpoint client system. Such a conventional software enrollment process has no tight physical and administrative security controls, so that a malicious actor (who may be another legitimate customer of the software vendor) may intervene and provide incorrect and illegitimate enrollment information to the client software agent that sends the client software agent to an invalid (e.g., rogue) registration server, or that results in the client software agent providing incorrect enrollment data to be registered on a valid and correct registration server. Such a conventional software enrollment process is performed without any guarantee that the enrollment information that a client software agent receives has not been tampered with or otherwise compromised.

In one respect, disclosed herein is a method, including: receiving an enrollment request in a server from across one or more networks coupled to the server, the enrollment request including enrollment information including an identity of an endpoint client system and a designated network location of a remote registration server; and in response to the enrollment request: provisioning an enrollment package having a payload including at least a portion of the enrollment information that includes the identity of the endpoint client system and the designated network location of the remote registration server, signing the enrollment package, and deploying the signed enrollment package across at least one of the one or more networks directly or through an intermediary system to the endpoint client system.

In another respect, disclosed herein is a method including operating an endpoint client system coupled in communication with one or more networks. The method may include performing the following in the endpoint client system: receiving an enrollment package in the endpoint client system from across at least one of the one or more networks, the enrollment package including a signed payload that includes enrollment information including a designated network location of a remote registration server; attempting to verify a signature of the signed enrollment package payload; and then performing the following only if the signed enrollment package payload is successfully verified: contacting the remote registration server across at least one of the one or more networks at the designated network location, and providing at least a portion of data from the enrollment package payload across at least one of the one or more networks to the registration server.

In another respect, disclosed herein is a system, including a client information handling system that includes at least one programmable integrated circuit programmed to: receive an enrollment package from across one or more networks communicatively coupled to the client information handling system, the enrollment package including a signed payload that includes enrollment information including a designated network location of a remote registration server; attempt to verify a signature of the signed enrollment package payload; and then perform the following only if the signed enrollment package payload is successfully verified: contacting the remote registration server across at least one of the one or more networks at the designated network location, and providing at least a portion of data from the enrollment package payload across at least one of the one or more networks to the registration server.

DESCRIPTION OF ILLUSTRATIVE EMBODIMENTS

Figure 1:
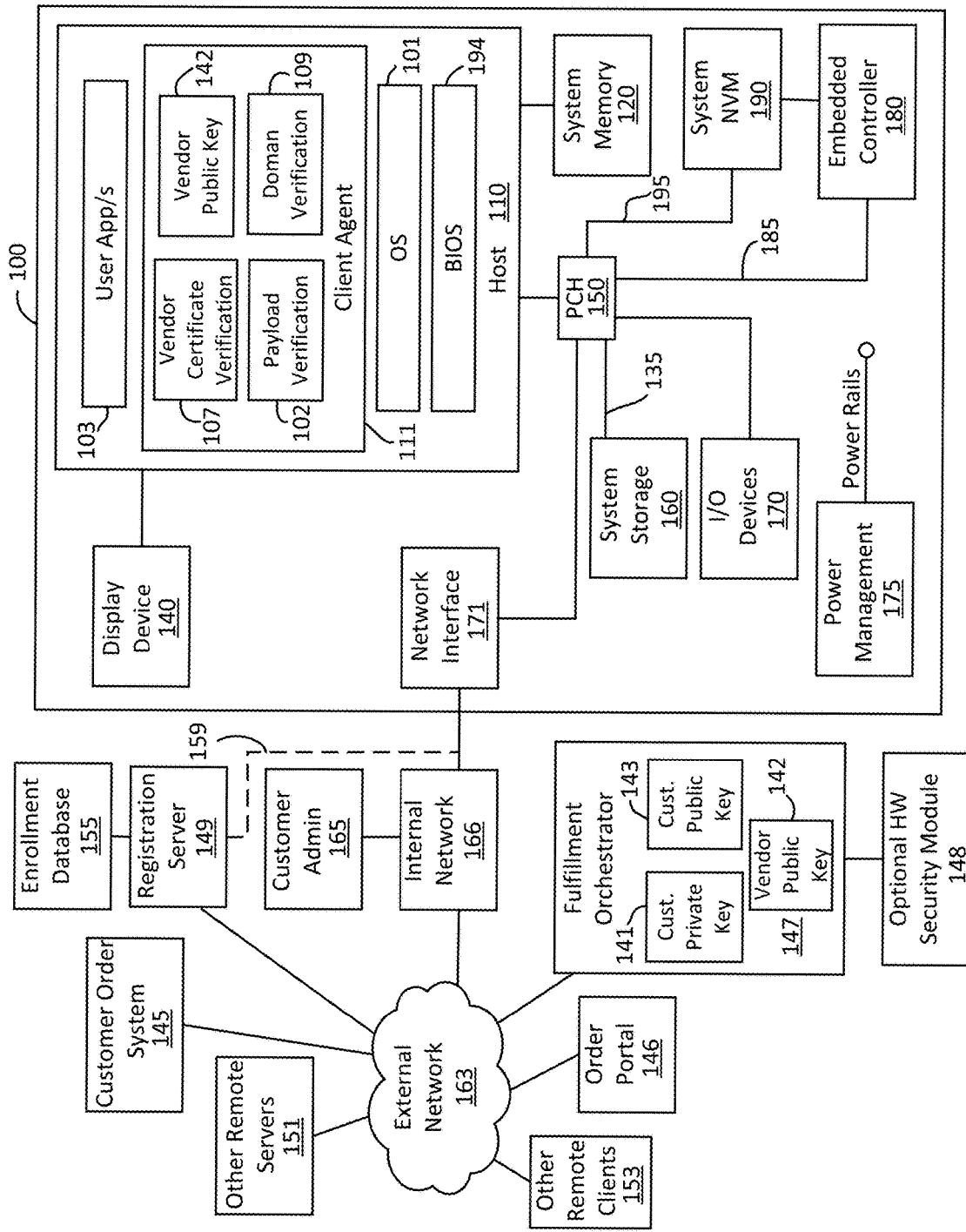
FIG. 1 illustrates a block diagram of an information handling system and software enrollment system according to one exemplary embodiment of the disclosed systems and methods.

FIG. 1 is a block diagram of an endpoint client system 100 (e.g., an information handling system such as a desktop computer, laptop computer, tablet computer, etc.) as it may be coupled via a network 163 to network components of a software enrollment system according to one embodiment of the disclosed systems and methods. In this regard, it should be understood that the configuration of FIG. 1 is exemplary only, and that the disclosed methods may be implemented on other types of information handling systems and software enrollment systems. It should be further understood that while certain components of an endpoint client system and a software enrollment system are shown in FIG. 1 for illustrating embodiments of the disclosed systems and methods, the endpoint client system and/or software enrollment system components are not restricted to including only those components shown in FIG. 1 and described below.

As shown in FIG. 1, endpoint client system 100 may include a host programmable integrated circuit 110 which may include any type of processing device, such as an Intel central processing unit (CPU), an Advanced Micro Devices (AMD) CPU or another programmable integrated circuit. Host programmable integrated circuit 110 is coupled as shown to system memory 120, which may include, for example, random access memory (RAM), dynamic RAM (DRAM), synchronous DRAM (SDRAM), etc. In the embodiment of FIG. 1, host programmable integrated circuit 110 may be configured to access system non-volatile memory 190 (e.g., serial peripheral interface (SPI) Flash memory) to load and boot part of a system BIOS 194, etc. In one embodiment, endpoint client system 100 may be a single tenant among a group of information handling system tenants 153 (e.g., each configured as an endpoint client system similar to endpoint client system 100) that share instances of one or more applications and/or other network resources (e.g., data, storage, processing, etc.) that are provided across network by one or more remote server/s 151 and/or registration server 149.

In FIG. 1, host programmable integrated circuit is executing an operating system (OS) 101 (e.g., proprietary OS such as Microsoft Windows 10, open source OS such as Linux OS, etc.) and BIOS 194 for system 100, as well as user software applications 103. Examples of user software applications 103 include, but are not limited to, software having backend policy and/or management components running on a registration server 149 and/or other remote server system/s 151. Other possible examples of user software applications 103 include, for example, locally-executing applications such as word processing applications, email applications, messaging applications, Internet browsers, computer games, PDF viewers, spreadsheet applications, etc. Also executing on host programmable integrated circuit in FIG. 1 is a client software agent 111 (e.g., an endpoint software agent for client software available from Dell Technologies Inc. of Round Rock, Texas such as Dell Hybrid Client, Dell Wyse ThinOS, etc.) As shown, client software agent 111 may include logic components such as vendor certificate verification logic 107, payload verification logic 102, and domain verification logic 109. A software vendor public key 142 may be embedded in the client software agent binary code as shown.

In the embodiment of FIG. 1, host programmable integrated circuit 110 may be coupled to an external or internal (integrated) display device 140 (e.g., LCD or LED display device or other suitable display device) of system 100. In such an embodiment, integrated graphics capability may be implemented by host programmable integrated circuit 110 to provide visual images (e.g., a graphical user interface, static images and/or dynamic content such as video images) to display device 140 for display to a system user. It will be understood that in other embodiments a separate programmable integrated circuit (e.g., such as graphics processor unit "GPU") may be coupled between host programmable integrated circuit 110 and display device 140 to provide graphics capability for endpoint client system 100.

In the embodiment of FIG. 1, a platform controller hub (PCH) 150 of endpoint client system 100 controls certain data paths and manages information flow between components of the endpoint client system 100. As such, PCH 150 may include one or more integrated controllers or interfaces for controlling data paths connecting PCH 150 with host programmable integrated circuit 110, system storage 160, input/output (I/O) devices 170, network interface (I/F) device 171, out-of-band programmable integrated circuit in the form of an embedded controller 180, and system NVM 190 storing logic components such as BIOS firmware image and settings, ACPI firmware, etc. In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

As shown in FIG. 1, external and/or internal (integrated) I/O devices 170 (e.g., a keyboard, mouse, touchpad, touchscreen, etc.) may be coupled to PCH 150 of system 100 to enable a local human user to input data to, and otherwise interact with, endpoint client system 100, and to interact with application programs or other software/firmware executing on host programmable integrated circuit 110. The network I/F device 171 enables wired and/or wireless communication with enrollment system components of FIG. 1 via an internal network 166 (e.g., corporate intranet) and an external network 163 (e.g., the Internet). In one embodiment, network I/F device 171 may be a network interface controller (NIC) which may communicate with external network 163 across the intervening internal or local area network (LAN) 166, and/or possibly across other networks such as wireless LAN (WLAN), cellular network, etc. It will be understood that one or more of the other network components of FIG. 1 (e.g., fulfillment orchestrator server 147, registration server 149, customer order system 145, order portal server 146, optional hardware security module 148, customer administrative server 165, other remote servers 151, other remote client systems 153, etc.) may be configured in one embodiment with one or more similar components and similar system architecture as endpoint client system 100.

In FIG. 1, local system storage 160 of endpoint client system 100 may include one or more media drives, such as hard disk drives (HDDs), optical drives, NVRAM, Flash memory, solid state drives (SSDs), or any other suitable form of internal or external storage that is coupled via data bus (e.g., PCIe bus. SATA bus, etc.) 135 through PCH 150 to provide non-volatile storage media for endpoint client system 100. A power source for endpoint client system 100 may be provided via an external power source (e.g., mains power) and an internal power supply regulator, and/or by an internal power source, such as a battery. As shown in FIG. 1, power management system 175 may be included within endpoint client system 100 for moderating the available power from the power source. In one embodiment, power management system 175 may be coupled to provide operating voltages on one or more power rails to various power-consuming components of endpoint client system 100, as well as to perform other power-related administrative tasks of the endpoint client system.

As shown in FIG. 1, out-of-band programmable integrated circuit 180 of endpoint client system 100 may be an embedded controller (EC) that is coupled to PCH 150 and which may be programmed to perform tasks of storage failure logic 183 as described elsewhere herein, and to execute other logic such as power/thermal system management, etc. Out-of-band programmable integrated circuit 180 may also be programmed to execute program instructions to boot information handling system 100, load application firmware from NVM 190 into internal memory, launch the application firmware, etc. Out-of-band programmable integrated circuit 180 may be, for example, a controller, microcontroller, microprocessor, ASIC, etc., or as a programmable logic device "PLD" such as FPGA, complex programmable logic device "CPLD", etc. Besides an embedded controller, other examples of out-band-programmable integrated circuits include, but are not limited to, baseboard management controller "BMC", service processor, embedded processor, remote access controller, etc. In this regard, an out-of-band programmable integrated circuit 180 is separate and independent from in-band host programmable integrated circuit 110 that runs the host OS 101 of the endpoint client system 100, and that executes without management of any application executing with the host OS 101 on the host programmable integrated circuit 110.

As shown in the exemplary embodiment of FIG. 1, EC 180 is coupled to PCH 150 within endpoint client system 100 via data bus 185, and NVM 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, NVM 190 may be a SPI Flash memory device that is a shared Flash memory device, which is connected to PCH 150 and EC 180. In such a configuration, PCH 150 provides EC 180 shared access to NVM 190 via eSPI bus 185, SPI bus 195, and various interface and logic blocks included within the PCH 150.

Also shown in the embodiment of FIG. 1 are network components of an enrollment system coupled via external network 163 (e.g., the Internet) in communication with endpoint client system 100 and/or each other. These enrollment system components include fulfillment orchestrator server 147, registration server 149, customer order system 145, order portal server 146, optional hardware security manager 148, and a customer administrator server 165 that is coupled between the external network 163 and endpoint client system 100, e.g., via an internal or local network 166 (e.g., such as a corporate intranet). In one embodiment, customer administrator server 165 may be an "on-premise" server operating at the same physical location as endpoint client system 100. It will be understood that in another embodiment, registration server 149 may be additionally or alternatively coupled (e.g., as an "on-premise" server operating at the same physical location as endpoint client system 100) in communication with endpoint client system 100 via internal or local network 166 as shown in FIG. 1 by optional dashed internal network connection 149.

Figure 2A:
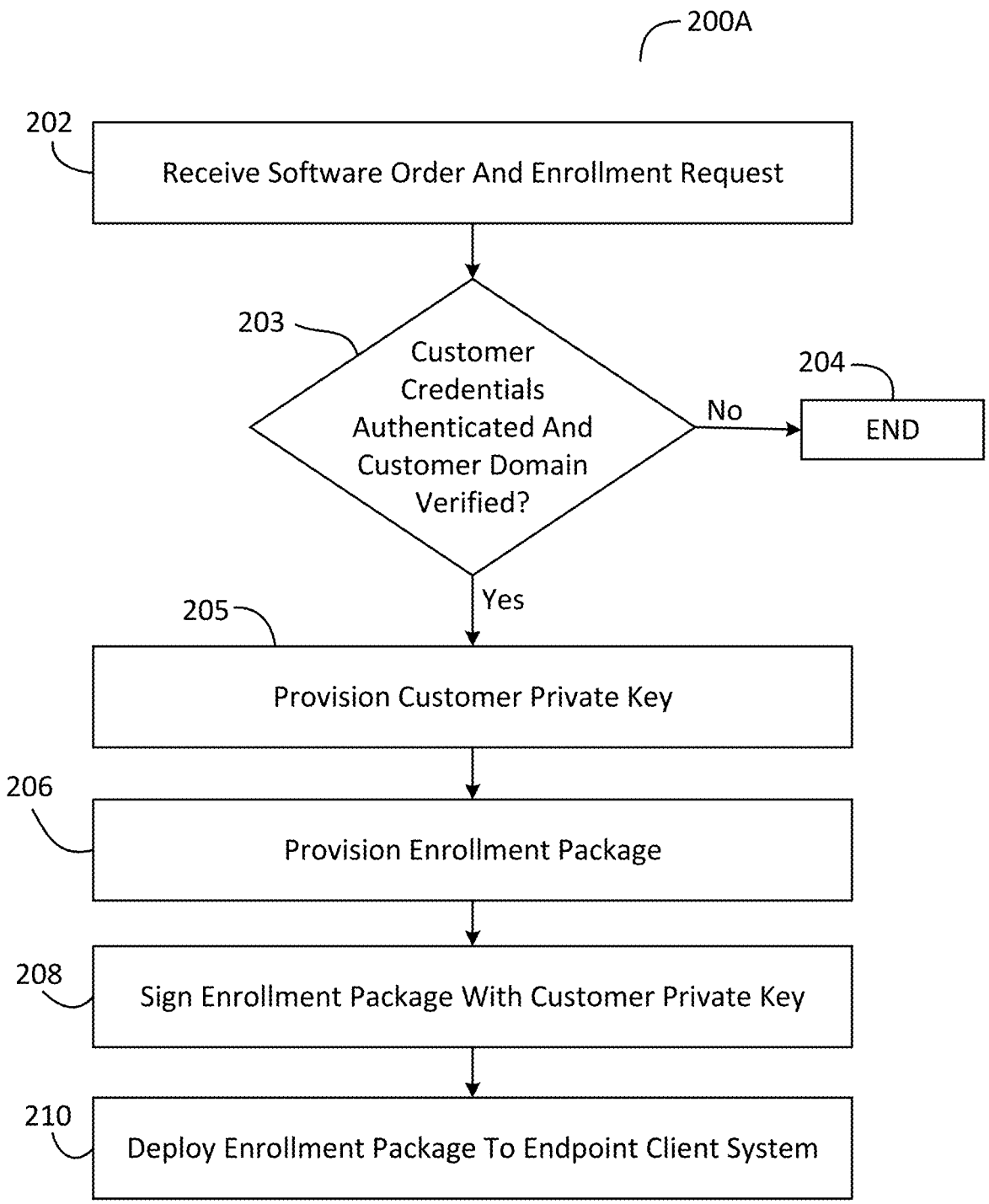
FIG. 2A illustrates methodology according to one exemplary embodiment of the disclosed systems and methods.

FIG. 2A illustrates one exemplary embodiment of a methodology 200A for provisioning and deploying an enrollment package to a given endpoint client system 100 according to one exemplary embodiment. As shown in block 202 of methodology 200A, an information handling system (e.g., that is operating as a remote fulfillment orchestrator server 147 in the cloud for a software vendor or any other type of software provider) may receive an enrollment request across external network 163 (e.g., such as the Internet), e.g., via optional order portal server 146. The enrollment request may be provided from an enrollment request originator, for example, via a server or an endpoint information handling system that is communicatively coupled to the network 163. In one exemplary embodiment, the enrollment request originator may be a software customer (e.g., enterprise customer) operating a customer order system 145, and in a further embodiment the enrollment request may be provided by the enrollment request originator together with a customer software purchase order (e.g., for purchasing client software agent 111 and enrolling endpoint client system 100). However, although an enrollment is described and illustrated in FIGS. 2A-2B herein in which the enrollment request originator is a software customer, it will be understood that an enrollment request originator may be any other entity and/or human user that submits the enrollment request via an information handling system coupled to network 163.

In one exemplary embodiment, client software agent 111 may already be installed on client endpoint system 100 but not capable of any operations except enrollment of endpoint client system 100. In such an exemplary embodiment, the act of successfully enrolling the given endpoint client system 100 with the registration server 149 then allows client software agent 111 to proceed with other operations. Also, after successful enrollment, additional software (if any) related to the endpoint client system enrollment may be downloaded to endpoint client system 100 and installed by endpoint client system 100, e.g., such as software that a software customer who originated the enrollment request has actually purchased through the customer order system 145.

The enrollment request received in block 202 from the software customer order system 145 may include enrollment information that identifies one or more of the enrollment request originator (e.g., software customer such as enterprise customer), endpoint client system 100, a designated intermediary system (e.g., such as customer administrative server 149) and/or the current enrollment request originator which may be a software customer user and/or customer entity (e.g., enterprise customer) that is operating software customer order system 145. The enrollment information may also include the identity of the designated registration server 149 and information and/or protocol for securely contacting registration server 149 to enroll endpoint client system 100.

Examples of enrollment information includes, but is not limited to, email domain for the endpoint client system 100, IP address of endpoint client system 100, IP address of customer administrative server 165, a uniform resource locator (URL) of registration server 140, a tenant name for endpoint client system 100, an originator email domain (that for a legitimate enrollment request should correspond to the email domain or enterprise domain of the intended given endpoint client system 100), a secure sockets layer (SSL) certificate of registration server 140, etc. In one embodiment, a legitimate enrollment request originator operating the software customer order system 145 may be an enterprise software customer having a pre-existing account with the software vendor that operates the fulfillment orchestrator server 147, and may have an assigned customer logon ID and password that is linked to the customer's account.

In block 203, the order portal 146 and/or fulfillment orchestrator server 147 may verify the legitimacy of the customer and the validity of the received software purchase order and enrollment request of block 202. This verification of block 203 may be performed, for example, by using multi-factor authentication (e.g., including customer email identity domain verification) to authenticate the legitimacy of the customer-presented logon credentials entered by the customer from the software customer order system 145 together with the enrollment request of block 202. In one embodiment, the order portal 146 and/or fulfillment orchestrator server 147 may compare the presented customer logon credentials of block 202 to a stored database of customer account information to verify that the presented customer logon credentials of block 202 match the logon credentials for a pre-existing customer account, e.g., maintained in a database accessible to the fulfillment orchestrator server 147.

In a further embodiment, the order portal 146 and/or fulfillment orchestrator server 147 may also verify that the email domain for the endpoint client system 100 (i.e., included in the enrollment information of block 202) matches the authenticated email domain of the current software customer submitting the software order and enrollment request of block 202.

For example, during block 202 a current customer user who is operating the software customer order system 145 may provide their email address (e.g., "admin@Company.com") when logging in through order portal 146. In block 203, order portal 146 may first verify the legitimacy the current customer user by sending an email back to "admin@Company.com" with a provided code, and the current customer user must respond by correctly entering the provided code into the webpage of order portal 146 to authenticate the email (and email domain) of the customer user before the customer software purchase order and enrollment request is allowed to proceed for further processing by fulfillment orchestrator server 147. Assuming the customer user email (and customer email domain such as "Company.com" in the above example) is successfully authenticated, the fulfillment orchestrator server 147 may then compare the email domain for the endpoint client system 100 (provided with the enrollment information of block 202) to the authenticated email domain of the current customer user (e.g., "Company.com") to ensure that they are the same.

If the customer logon or the subsequent customer email domain verification fails (i.e., the email domain for the endpoint client system 100 does not match the authenticated email domain of the current software customer) in block 203, then methodology 200A proceeds to block 204 where methodology 200A terminates without provisioning and deploying an enrollment package to the endpoint client system 100. However, upon successful customer logon and successful verification that the email domain for the endpoint client system 100 matches the authenticated email domain of the current software customer, the fulfillment orchestrator server 147 may then provision (e.g., generate or retrieve from storage) a signing certificate (e.g., customer private key 141) in block 205 that is specific and unique to the current customer (e.g., enterprise customer) operating the software customer order system 145. In this regard, a unique customer private key 141 may be assigned to each different customer (e.g., each different enterprise customer of the software vendor).

The unique customer private key 141 may be a pre-existing customer private key that has been previously-assigned to the current software customer and that is retrieved from storage in block 203 by the fulfillment orchestrator server 147 as needed for each software order and enrollment request submitted by the same software customer. Alternatively, the unique customer private key 141 may instead be a new private key that is generated and assigned to the current software customer at the time of the current software order and enrollment request. In the latter case, it is possible that a new and different customer private key 141 may be assigned to a given software customer for each new software order and enrollment request received from the given software customer, or it is alternatively possible that a new and different customer private key 141 may be periodically assigned to the given software customer after pre-defined period of time and/or after a predefined number of software orders and corresponding enrollment requests have been received from the same software customer.

In one embodiment, the unique customer private key 141 may be optionally created block 205 by an optional hardware security module (HSM) 148 (i.e., instead of the fulfillment orchestrator server 147) which operates as a known infrastructure key device. In such an optional embodiment, fulfillment orchestrator server 147 may make calls to the HSM 148 to perform signing operations using the unique customer private key 141. Such a HSM 148 may store the created unique customer private key 141 (e.g., on internal non-volatile memory of the module 148) for the current software customer, together with different unique customer private keys 141 created for other different software customers. In addition to unique customer private keys 141, the optional HSM 148 may also store a customer public key 143 corresponding to each unique customer private key 141, and a vendor public key 142 that is unique to the software vendor, e.g., that supplies the client software agent 111 (on system 100) and that operates the fulfillment orchestrator server 147. In such an optional embodiment, fulfillment orchestrator server 147 may make calls to the HSM 148 to perform signing operations using each of customer private key 141, customer public key 143 and vendor public key 142 as needed to complete the blocks of methodologies 200A and 200B described herein, but without otherwise exposing the keys stored on the hardware security module 148.

Still referring to FIG. 2A, in response to a fulfillment request of block 202 that is verified in block 203 and customer private key creation/provision in block 205, the fulfillment orchestrator server 147 may then in block 206 provision (e.g., assemble and provide) an enrollment package having a payload that includes at least a portion of the enrollment information (e.g., at least one of registration server URL, tenant name, software customer email domain, registration server SSL certificate for server pinning purposes, etc.) that was provided to the fulfillment orchestrator server 147 by the originator of the enrollment request (via customer order system 145) with the enrollment request. The fulfillment orchestrator server 147 may also include within the enrollment package a software vendor public signing certificate (e.g., vendor public key 142) together with a customer public key 143 that corresponds to the customer private key 141. As shown in FIG. 1, the same software vendor public key 142 may be previously embedded in the binary code of a client software agent 111 that is already installed and executing on a host programmable integrated circuit 110 (e.g., such as central processing unit "CPU") of the endpoint client system 100.

In block 208, the fulfillment orchestrator server 147 may then sign the enrollment package using the previously-provisioned customer private key 141 as a signing certificate. After block 208 of methodology 200A, the enrollment package is now ready for deployment to the endpoint client system 100.

Next, in block 210 of methodology 200A, the previously signed enrollment package may be deployed across the external network 163 to the endpoint client system 100 in any suitable manner. For example, the signed enrollment package may be provided across network 163 to an intermediary information handling system designated by the enrollment information (e.g., such as customer administrative server 165) and from there pushed onto (or actively retrieved by) the client software agent 111 executing on the endpoint client system 100 across internal network 166, e.g., using any suitable broadcast or deployment mechanism (e.g., such as via System Center Configuration Manager "SCCM", dynamic host configuration protocol "DHCP", group policy object "GPO", email, etc.) such as may be selected by a human administrator operating the customer administrative server 165. Alternatively, the signed enrollment package may be provided directly to endpoint client system 100 identified in the enrollment information.

Figure 2B:
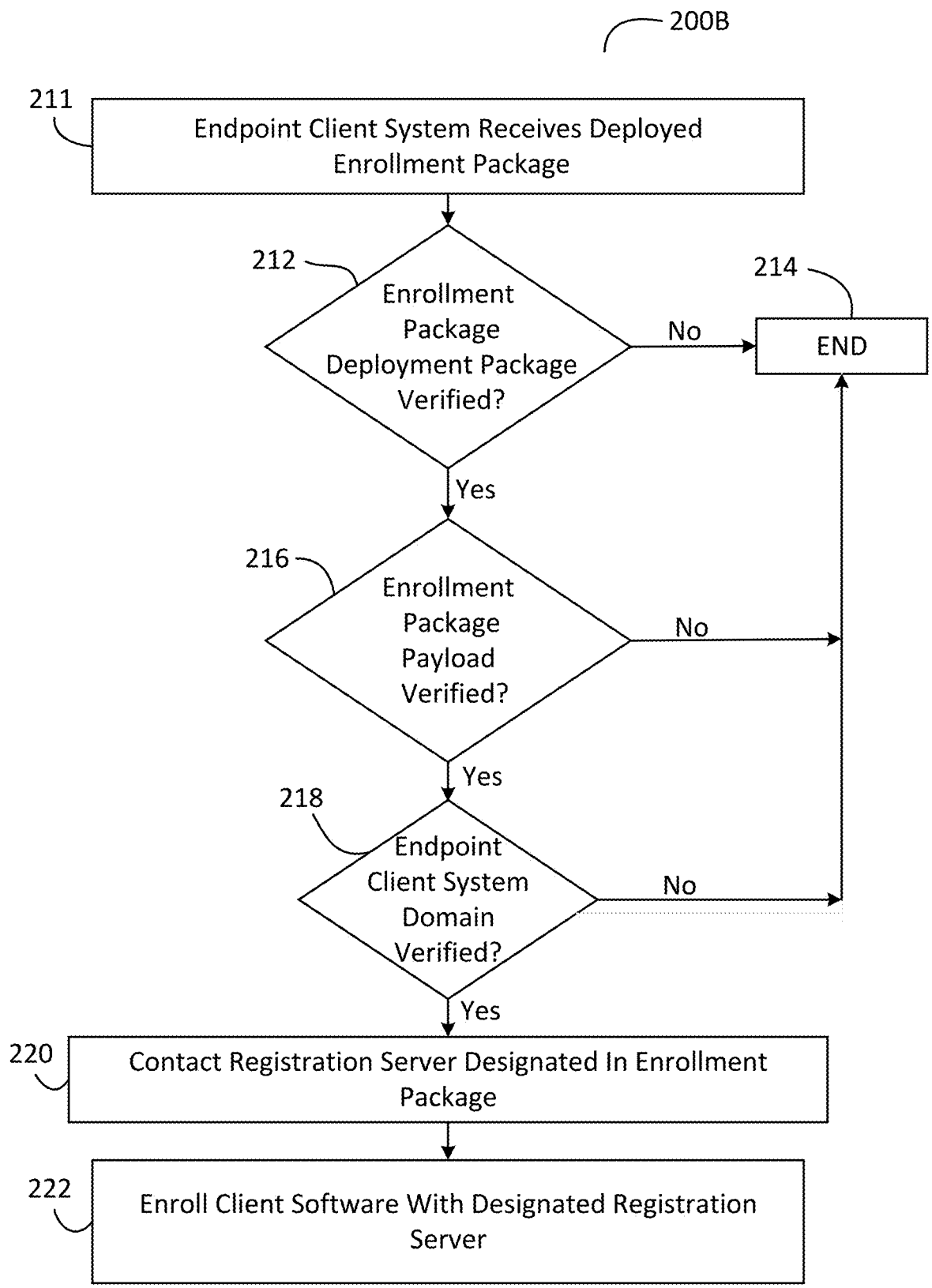
FIG. 2B illustrates methodology according to one exemplary embodiment of the disclosed systems and methods.

Once the enrollment package has been deployed in block 210 of methodology 200A to the endpoint client system 100, the client software agent 111 executing on host programmable integrated circuit 110 of endpoint client system 100 be programmed in one embodiment to perform methodology 200B of FIG. 2B to verify both the deployment chain and the signature of the enrollment package before the client software agent 111 contacts the designated registration server 149 to enroll the corresponding endpoint client system 100. In one embodiment, the designated registration server 149 may execute backend policy and/or management components required for operation of one or more of user applications of installed client software 103, e.g., such as Dell Hybrid Client, Dell Wyse ThinOS, etc.

Methodology 200B of FIG. 2B begins in block 211 with client software agent 111 on endpoint client system 100 receiving the enrollment package that was deployed in step 210 of FIG. 2A. Next in block 212, vendor certificate verification logic 107 of the client software agent 111 may verify the deployment chain for the enrollment package by ensuring that the software vendor public signing certificate (e.g., vendor public key 142) contained in the enrollment package matches (i.e., chains up to) the public root certificate (e.g., vendor public key 142) that is already embedded within the binary code of the client software agent 111 that is installed on the endpoint client system 100. If the vendor certificate verification logic 107 of client software agent 111 determines in block 212 that the vendor public signing certificate 142 contained in the enrollment package is not valid (e.g., the vendor public signing certificate 142 does not match the public root certificate or vendor public key 142) that is embedded within the binary code of the client software agent 111, then methodology 200 terminates in block 214 without enrolling the endpoint client system 100.

However, if the vendor certificate verification logic 107 of the client software agent 111 determines in block 212 that the vendor public signing certificate 142 and thus the deployment chain for the enrollment package are valid, then the integrity of enrollment package may then be subsequently verified in block 216 by payload verification logic 102 of endpoint client system 100 using the customer public key 142 that is included in the enrollment package to match the signature of the enrollment package payload, e.g., by using asymmetric signature verification.

For example, in one exemplary embodiment, payload verification logic 102 of the client software agent 111 may verify the enrollment package payload signature in block 216 using the customer public key 142 to obtain the hash value from the signature of the enrollment package payload that was created using the customer private key 141, and then to compare this obtained hash value to a calculated hash value of the data of the enrollment package information to verify that the hash value of the signature matches (i.e., is the same as) the hash value of the enrollment package data. The hash value of the enrollment package may be calculated, for example, by feeding the contents of the enrollment package into a cryptographic hashing algorithm (e.g., SHA-2 algorithm such as SHA-256, SHA-284, SHA-512; SHA-3 algorithm, etc.; or any other suitable cryptographic hashing algorithm). For verification, payload verification logic 102 may strip the signature from the enrollment package in order to calculate the hash over the naked enrollment package, then compare to the signature, e.g., using any suitable asymmetric cryptography signature mechanism such as RSA PSS (RSASSA PSS), etc., or any other suitable asymmetric cryptography signature mechanism. In this regard, it will be understood that the example details of the above described embodiment are exemplary only, and that any other alternative technique or methodology suitable for verifying the enrollment package payload signature using asymmetric signature verification may be employed in block 216.

If the payload verification logic 102 of the client software agent 111 determines in block 216 that the hash value of the enrollment package signature does not match the calculated hash value of the enrollment package data, then the payload of the enrollment packages is not verified, and methodology 200 terminates in block 214 without enrolling the endpoint client system 100.

However, if the vendor certificate verification logic 107 of the client software agent 111 determines in block 216 that the hash value of the enrollment package signature matches the calculated hash value of the enrollment package data, then the payload of the enrollment package is verified, and methodology 200 then proceeds to block 218 where domain verification logic 109 of client software agent 111 may compare the actual email domain of the endpoint client system 100 with the software customer email domain information included in the payload of the enrollment package. If the domain verification logic 109 of client software agent 111 determines in block 218 that the actual email domain of the endpoint client system 100 does not match the software customer domain information included in the payload of the enrollment package, then the endpoint client system domain is not verified and methodology 200 terminates in block 214 without enrolling the endpoint client system 100, e.g., to ensure that the endpoint client system 100 is not maliciously diverted to a registration server that is different from the legitimate registration server 149.

However, if the domain verification logic 109 of client software agent 111 determines in block 218 that the actual email domain of the endpoint client system 100 matches the software customer email domain information included in the payload of the enrollment package, then then the endpoint client system domain is verified and methodology 200 proceeds to block 220 where client software agent 111 uses the correct URL to contact the designated legitimate registration server 149 across networks 166 and/or 163. Then, in block 222 client software agent 111 enrolls the endpoint client system 100 with the intended legitimate registration server 149 designated by the enrollment package. In one embodiment of block 220, the client software agent 111 may optionally pin the registration server 149 to the correct SSL server certificate (e.g., included in the enrollment package). In block 222, the client software agent may then present the registration server 149 with enrollment data (e.g., such as application key and customer or tenant identifier, an API key, other shared secret, etc.) from the enrollment package that the client software agent 111 has already verified to be unchanged (e.g., untampered with) from the time of package creation by the fulfillment orchestrator server 147.

Registration server 149 may respond to the provided enrollment data of block 222 by taking steps to enroll endpoint client system 100 on registration server 149, e.g., such as by adding identity information of endpoint client system 100 (e.g., identifier such as MAC address, universally unique identifier "UUID", IP address, etc.) to an enrollment database 155 maintained by server 222, providing additional software (e.g., one or more software applications 103 and/or services, etc.) across network 163 for execution on endpoint client system 100, etc. In this way, the methodologies 200A and 200B of FIGS. 2A and 2B may be employed to ensure that a bad actor (e.g., who may also be a legitimate customer) does not maliciously divert the endpoint client system 100 to a different and incorrect registration server.

Figure 3:
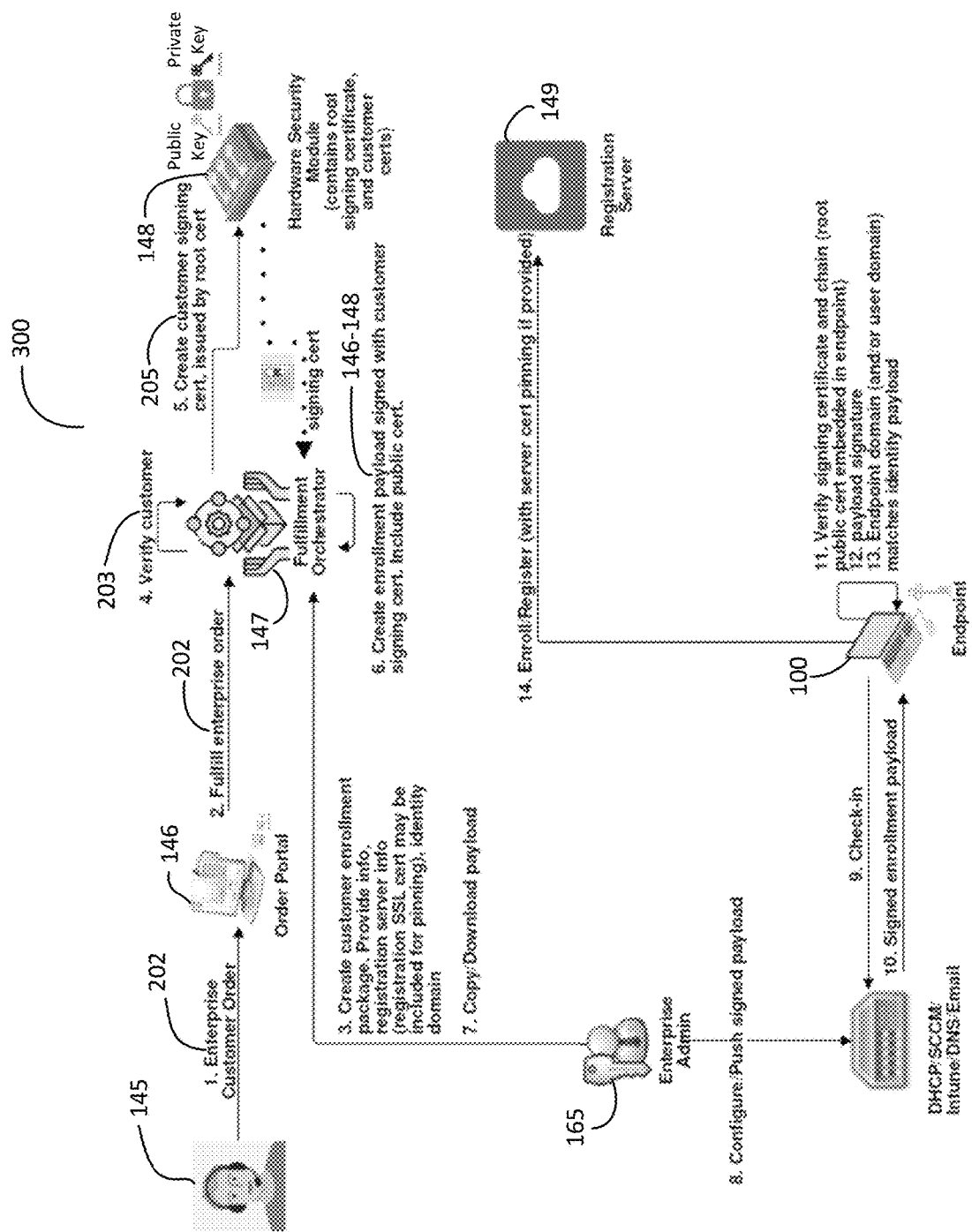
FIG. 3 illustrates one component flow according to one exemplary embodiment of the disclosed systems and methods.

FIG. 3 illustrates one exemplary embodiment of a process flow 300 that may be implemented between the components of the software enrollment system and endpoint client system 100 of FIG. 1 using the methodologies 200A and 200B of respective FIGS. 2A and 2B. Sequential number in FIG. 3 denotes the order of exemplary actions performed by process flow 300.

It will be understood that the particular combination of blocks of methodologies 200A and 200B are exemplary only, and that other combinations and/or order of additional, fewer, and/or alternative blocks may be employed that are suitable for orchestrating trusted enrollment of endpoint client system by deploying a signed payload of an enrollment package to the endpoint client system, and by using a client software agent executing on the endpoint client system to first verify the distribution chain and/or signature of the deployed enrollment package before proceeding to use other information contained in the enrollment package to contact a registration server to enroll the endpoint client system 100.

It will also be understood that one or more of the tasks, functions, or methodologies described herein (e.g., including those described herein for components 101, 102, 103, 107, 109, 110, 111, 145, 146, 147, 148, 149, 151, 153, 165, 180, 194, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more blocks of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more blocks of the present methodologies may be employed in one or more code segments of the computer program. For example, a code segment executed by the information handling system may include one or more blocks of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method comprising operating an endpoint client system coupled in communication with one or more networks, the method comprising performing the following in the endpoint client system:

receiving an enrollment package in the endpoint client system from across at least one of the one or more networks, the enrollment package comprising a payload that includes enrollment information comprising a designated network location of a remote registration server;

attempting to verify a signature of the signed enrollment package payload; and then performing the following only if the signed enrollment package payload is successfully verified:

contacting the remote registration server across at least one of the one or more networks at the designated network location, and providing at least a portion of data from the enrollment package payload across at least one of the one or more networks to the registration server;

where the method further comprises receiving an enrollment request in a server from across the one or more networks, the enrollment request including enrollment information including an identity of the endpoint client system and the designated network location of the remote registration server; and in response to the enrollment request:

provisioning the payload of the enrollment package to comprise at least a portion of the enrollment information that comprises the identity of the endpoint client system and the designated network location of the remote registration server, signing the enrollment package, and deploying the signed enrollment package across at least one of the one or more networks directly or through an intermediary system to the endpoint client system.

2. The method of claim 1, further comprising attempting to verify one or more credentials presented by an originator of the enrollment request; and then only performing the provisioning, signing and deploying if the one or more credentials presented by the originator of the enrollment request are verified.

3. The method of claim 1, where the enrollment information comprises an email domain of the enrollment request originator and an email domain of the endpoint client system; and where the method further comprises:

authenticating the email domain of the enrollment request originator;

comparing the email domain of the endpoint client system to the authenticated email domain of the enrollment request originator; and then only performing the provisioning, signing and deploying if the email domain of the endpoint client system is the same as the authenticated email domain of the enrollment request originator.

4. The method of claim 1, further comprising provisioning a private key that is unique to the enrollment request originator; where the provisioning further comprises including a public key in the enrollment package that corresponds to the private key that is unique to the enrollment request originator; and where the signing of the enrollment package further comprises signing the enrollment package with the private key that is unique to the enrollment request originator.

5. The method of claim 1, where the provisioning further comprises including a public key in the enrollment package that is unique to a software provider that deploys the signed enrollment package from the server.

6. The method of claim 1, where the provisioning comprises provisioning the enrollment package having the payload comprising at least a portion of the enrollment information that further comprises at least one of a uniform resource locator (URL) of the registration server, a tenant name for the endpoint client system, email domain of an originator of the enrollment package, or a secure sockets layer (SSL) certificate of the registration server.

7. The method of claim 1, where an originator of the enrollment request is an enterprise software customer; and where a software vendor receives the enrollment request in the server and performs the provisioning, signing and deploying of the signed enrollment package from the server.

8. The method of claim 1, where the enrollment package payload is signed with a private key; where the attempting to verify a signature of the signed enrollment package payload comprises comparing a hash value obtained from the signature of the enrollment package payload to a calculated hash value of data of the enrollment package; and where the signed enrollment package payload is successfully verified only if the hash value obtained from the signature of the enrollment package payload is the same as the calculated hash value of the data of the enrollment package.

9. The method of claim 1, where the enrollment information comprises at least one of a uniform resource locator (URL) of the registration server, a tenant name for the endpoint client system, email domain of an originator of the enrollment request, or a secure sockets layer (SSL) certificate of the registration server.

10. A method comprising operating an endpoint client system coupled in communication with one or more networks, the method comprising performing the following in the endpoint client system:

receiving an enrollment package in the endpoint client system from across at least one of the one or more networks, the enrollment package comprising a payload that includes enrollment information comprising a designated network location of a remote registration server;

attempting to verify a signature of the signed enrollment package payload; and then performing the following only if the signed enrollment package payload is successfully verified:

contacting the remote registration server across at least one of the one or more networks at the designated network location, and providing at least a portion of data from the enrollment package payload across at least one of the one or more networks to the registration server;

where the received enrollment package further comprises a public key unique to a provider of the enrollment package, and where the method further comprises executing an agent on a programmable integrated circuit of the endpoint client system to:

compare the public key unique to a software provider of the enrollment package to a public key that is embedded in a binary code of the agent to determine if they are the same, and then perform the contacting of the remote registration server and the providing of the at least a portion of data from the enrollment package payload across the at least one of the one or more networks to the registration server only if both:

the public key that is embedded in a binary code of the agent is determined to be the same as the public key unique to the software provider of the enrollment package, and if the signed enrollment package payload is successfully verified.

11. A method comprising operating an endpoint client system coupled in communication with one or more networks, the method comprising performing the following in the endpoint client system:

receiving an enrollment package in the endpoint client system from across at least one of the one or more networks, the enrollment package comprising a payload that includes enrollment information comprising a designated network location of a remote registration server;

attempting to verify a signature of the signed enrollment package payload; and then performing the following only if the signed enrollment package payload is successfully verified:
contacting the remote registration server across at least one of the one or more networks at the designated network location, and
providing at least a portion of data from the enrollment package payload across at least one of the one or more networks to the registration server;

where the enrollment information of the received enrollment package further comprises an email domain of an originator of an enrollment request for the enrollment package, and where the method further comprises performing the following in the endpoint client system:
comparing the email domain of the originator of the enrollment request to an email domain of the endpoint client system, and
then performing the contacting of the remote registration server and the providing of the at least a portion of data from the enrollment package payload across at least one of the one or more networks to the registration server only if both:
the email domain of the originator of the enrollment request is determined to be the same as the email domain of the endpoint client system, and
if the signed enrollment package payload is successfully verified.

12. The method of claim 11, where the originator of the enrollment request is an enterprise software customer.

13. A method comprising operating an endpoint client system coupled in communication with one or more networks, the method comprising performing the following in the endpoint client system:
receiving an enrollment package in the endpoint client system from across at least one of the one or more networks, the enrollment package comprising a payload that includes enrollment information comprising a designated network location of a remote registration server;
attempting to verify a signature of the signed enrollment package payload; and
then performing the following only if the signed enrollment package payload is successfully verified:
contacting the remote registration server across at least one of the one or more networks at the designated network location, and
providing at least a portion of data from the enrollment package payload across at least one of the one or more networks to the registration server;
where the enrollment information further comprises a secure sockets layer (SSL) certificate of the registration server; and where the contacting the remote registration server across at least one of the one or more networks at the designated network location further comprises pinning the registration server to the SSL server certificate included in the enrollment package.

14. A method comprising operating an endpoint client system coupled in communication with one or more networks, the method comprising performing the following in the endpoint client system:
receiving an enrollment package in the endpoint client system from across at least one of the one or more networks, the enrollment package comprising a payload that includes enrollment information comprising a designated network location of a remote registration server;

attempting to verify a signature of the signed enrollment package payload; and then performing the following only if the signed enrollment package payload is successfully verified:
contacting the remote registration server across at least one of the one or more networks at the designated network location, and
providing at least a portion of data from the enrollment package payload across at least one of the one or more networks to the registration server;

where the one or more networks comprise an external network and an internal or a local network; where the registration server is coupled in communication with the endpoint client system via the internal or local network; and where the endpoint client system receives the enrollment package from across at least one of the external network or the internal or local network.

15. A system, comprising:
a client information handling system comprising at least one programmable integrated circuit programmed to:
receive an enrollment package from across one or more networks communicatively coupled to the client information handling system, the enrollment package comprising a signed payload that includes enrollment information comprising a designated network location of a remote registration server;
attempt to verify a signature of the signed enrollment package payload; and
then perform the following only if the signed enrollment package payload is successfully verified:
contacting the remote registration server across at least one of the one or more networks at the designated network location, and
providing at least a portion of data from the enrollment package payload across at least one of the one or more networks to the registration server;
where the received enrollment package further comprises a public key unique to a provider of the enrollment package, and where the at least one programmable integrated circuit is further programmed to:
compare the public key unique to a software provider of the enrollment package to a public key that is embedded in a binary code executing on the at least one programmable integrated circuit to determine if they are the same, and
then perform the contacting of the remote registration server and the providing of the at least a portion of data from the enrollment package payload across the at least one of the one or more networks to the registration server only if both:
the public key that is embedded in the binary code executing on the at least one programmable integrated circuit is determined to be the same as the public key unique to the software provider of the enrollment package, and
if the signed enrollment package payload is successfully verified.

16. A system, comprising:
a client information handling system comprising at least one programmable integrated circuit programmed to:
receive an enrollment package from across one or more networks communicatively coupled to the client information handling system, the enrollment package comprising a signed payload that includes enrollment information comprising a designated network location of a remote registration server;

attempt to verify a signature of the signed enrollment package payload; and then perform the following only if the signed enrollment package payload is successfully verified:
contacting the remote registration server across at least one of the one or more networks at the designated network location, and
providing at least a portion of data from the enrollment package payload across at least one of the one or more networks to the registration server;

where the enrollment information of the received enrollment package further comprises an email domain of an originator of an enrollment request for the enrollment package, and where the at least one programmable integrated circuit is further programmed to:
compare the email domain of the originator of the enrollment request to an email domain of the endpoint client system, and
then perform the contacting of the remote registration server and the providing of the at least a portion of data from the enrollment package payload across at least one of the one or more networks to the registration server only if both:
the email domain of the originator of the enrollment request is determined to be the same as the email domain of the endpoint client system, and
if the signed enrollment package payload is successfully verified.

17. A system, comprising:
a client information handling system comprising at least one programmable integrated circuit programmed to:
receive an enrollment package from across one or more networks communicatively coupled to the client information handling system, the enrollment package comprising a signed payload that includes enrollment information comprising a designated network location of a remote registration server;
attempt to verify a signature of the signed enrollment package payload; and
then perform the following only if the signed enrollment package payload is successfully verified:
contacting the remote registration server across at least one of the one or more networks at the designated network location, and
providing at least a portion of data from the enrollment package payload across at least one of the one or more networks to the registration server;
where the system further comprises a server information handling system communicatively coupled to the client information handling system by at least one of the one or more networks, the server information handling system comprising at least one programmable integrated circuit programmed to:
receive an enrollment request in a server from across at least one of the one or more networks, the enrollment request including enrollment information including an identity of the client information handling system and a designated network location of a remote registration server, and
in response to the enrollment request:
provision the payload of the enrollment package to comprise at least a portion of the enrollment information that comprises the identity of the endpoint client system and the designated network location of the remote registration server,
sign the enrollment package, and
deploy the signed enrollment package across at least one of the one or more networks directly or through an intermediary system to the endpoint client system.

18. The system of claim 17, further comprising the registration server, the registration server being an information handling system communicatively coupled to the endpoint client information handling system by at least one of the one or more networks.

19. The system of claim 18, further comprising an additional information handling system coupled to the server by at least one of the one or more networks, the additional information handling system originating and providing the enrollment request to the server across at least one of the one or more networks.

\* \* \* \* \*